United States Patent
Eberly, Jr.

[15] 3,686,341
[45] Aug. 22, 1972

[54] PROCESS FOR AROMATIZATION OF OLEFIN HYDROCARBONS

[72] Inventor: Paul E. Eberly, Jr., 9440 Ventura Dr., Baton Rouge, La. 70815

[22] Filed: Aug. 31, 1970

[21] Appl. No.: 68,393

[52] U.S. Cl. ............... 260/673.5, 208/134, 252/455
[51] Int. Cl. ............................................. C07c 5/26
[58] Field of Search .......... 260/673.5, 673; 208/134; 252/455

[56] References Cited

UNITED STATES PATENTS

| | | | |
|---|---|---|---|
| 2,962,536 | 11/1960 | Pitts | 260/673.5 |
| 2,445,345 | 7/1948 | Byrns | 208/134 |
| 2,363,768 | 11/1944 | Zetterholm | 260/673.5 |
| 3,317,438 | 5/1967 | Engebretson | 252/455 |
| 3,215,494 | 11/1965 | Hemstock | 23/110 |
| 2,640,756 | 6/1953 | Wills | 23/111 |
| 3,580,960 | 5/1971 | Keen et al. | 260/683.3 |
| 3,254,023 | 5/1966 | Miale et al. | 208/120 |

OTHER PUBLICATIONS

Chem. Abstracts, Vol. 48, 1954, p. 3777(g).
Chem. Abstracts, Vol. 52, 1958, p. 4070(f).
Chem. Abstracts, Vol. 53, 1959, p. 7712(g).

Primary Examiner—Delbert E. Gantz
Assistant Examiner—J. Nelson
Attorney—Pearlman and Schlager and Llewellyn A. Proctor

[57] ABSTRACT

A process for the aromatization of olefin hydrocarbons at temperatures ranging from about 300°–800° C. and pressures ranging from about atmospheric to about 150 psi, by contact with catalyst composites of new and novel forms of chrysotile, improved in many of its physical and chemical characteristics as contrasted with previous species, and Group VIB or Group VIII transition metals.

10 Claims, 1 Drawing Figure

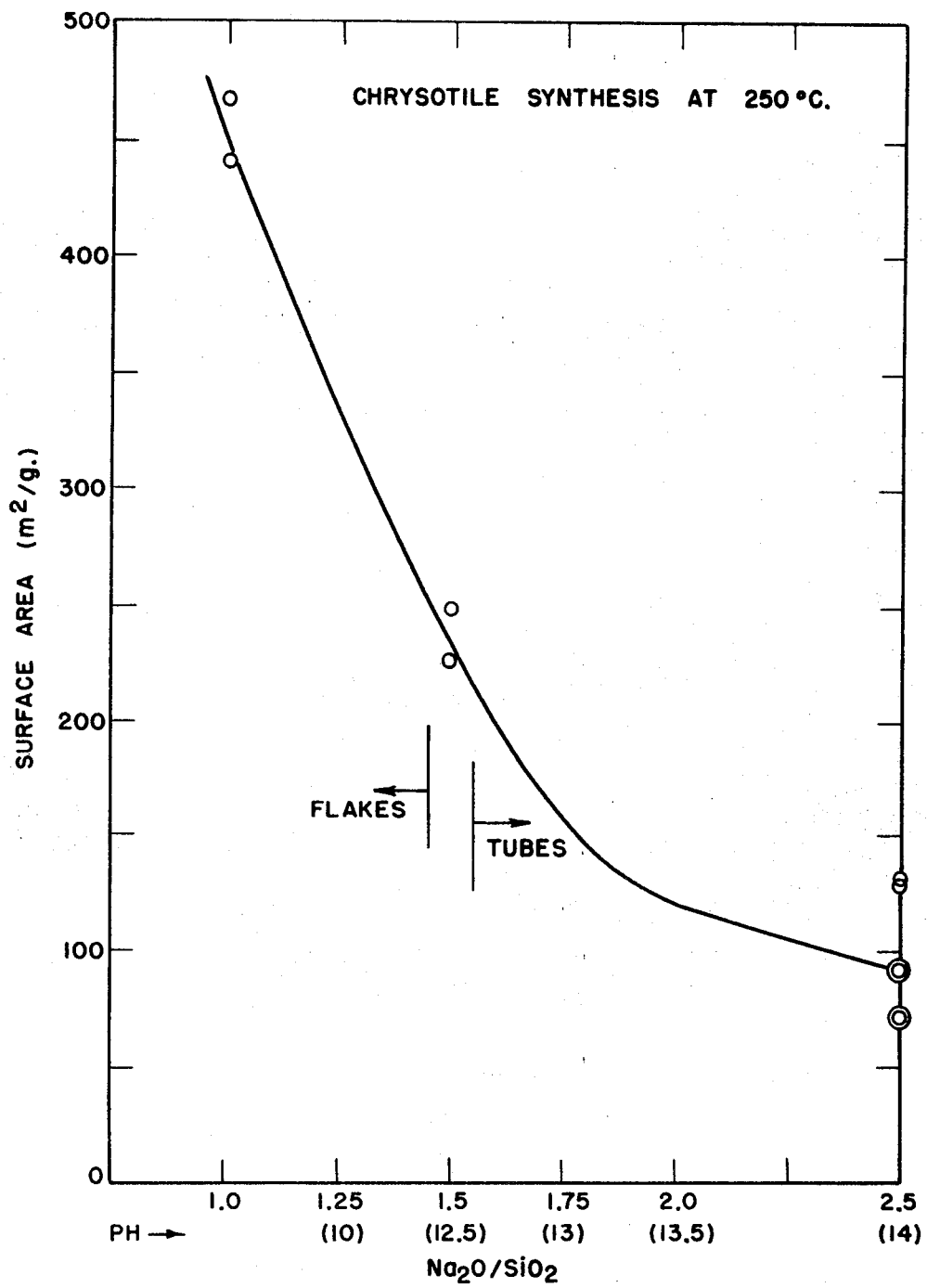
INVENTOR.
PAUL E. EBERLY
BY

PROCESS FOR AROMATIZATION OF OLEFIN HYDROCARBONS

Certain forms of layered complex metal silicates are formed of sheets of paired layers of $Si_2O_5$, or serpentine, fused together with layers of metal chemically combined with hydroxyl ions. Illustrative of such naturally occurring materials which have common morphological and structural characteristics are chrysotile, $Mg_3(OH)_4Si_2O_5$, garnierite, $Ni_3(OH)_4Si_2O_5$, metahalloysite, $Al_2(OH)_4Si_2O_5$, and kaolinite, $Al_2(OH)_4i_2O_5$. Synthetic complex metal silicates of this character have been formed, these materials generally retaining their high stability while having a higher degree of dispersability, purity and homogeneity than those products found in nature. These synthetic materials, particularly the pure materials, are thus useful as filtering mediums, absorbents, fillers and the like. Because of their high stability to heat, they are also useful in the production of high temperature or flame resistant fabrics, and can be used in woven and nonwoven fabrics.

Asbestos is a naturally-occurring complex metal silicate of this character. The term, commonly used to identify a material of a fibrous textile nature capable of being woven into a fabric, is more specifically used to identify a variety of serpentines called chrysotile, ideally $Mg_3(OH)_4Si_2O_5$, supra, a species of layered complex metal silicate. Though the structure can differ in chemical composition to some extent due to the presence of impurities, this naturally-occurring material as other forms of chrysotile is a serpentine of type formed of sheets of paired layers of $Si_2O_5$ fused together with layers of metal, in this instance magnesium, chemically combined with hydroxyl ions. Investigations have been made of the properties of these forms of complex metal silicates, and it has been reported, e.g., that natural chrysotile has the configuration of hollow tubes or cylindrical fibrils with an average Kolloid-Zeitschrift,"diameter of 200 to 250 A. (Angstrom units) and an average inner diameter of 20 to 50 A. As reported in the "Encyclopedia of Chemical Technology," Second Edition, Volume 2, p. 738 (Interscience Publishers), naturally-occurring chrysotiles typically have surface areas varying from 4 to 12 square meters per gram ($m^2/g$) though by additional fibrilization the surface areas can be increased to 30 to 50 $m^2/g$. Noll et al have reported [("Kollid-Zeitschrift," Volume 157 [1], pages 1 to 11)] that synthetic chrysotile, $Mg_3(OH)_4Si_2O_5$, can be prepared having surface areas ranging as high as 110 $m^2/g$ (BET Method). Noll et al have also reported [Beitrage zur Minralogie und Petrographie, Volume 7, 1960, pages 232–241] synthetic nickel and cobalt substituted forms of chrysotile——viz., garnierite, $Ni_3(OH)_4Si_2O_5$, and $Co_3(OH)_4Si_2O_5$—with surface areas ranging as high as 125 $m^2/g$ and 190 $m^2/g$ (BET Method), respectively. Little has been reported in regard to other forms of chrysotile.

Chrysotiles have in the past been used as support materials, or carriers, for oxidation catalysts such as platinum supported on natural chrysotile for use in the conversion of sulfur dioxide to sulfur trioxide. Despite the apparent advantages offered by the extremely high thermal stability of this class of complex metal silicate, these materials, insofar as is known, have never been used except as catalyst supports. A reason for this, perhaps, is because, in their natural state, little if any catalytic activity is shown. Moreover, though purer and more catalytically interesting forms have been prepared synthetically over many years, these materials yet remain little more than a matter of academic interest. Perhaps this is due in part to the extreme difficulty of preparing even minute amounts of these materials for experimentation.

Until now, synthesis of layered complex metal silicates, highly preferred of which are the chrysotiles, has only been possible under hydrothermal conditions at relatively high temperatures and extreme pressures. Generally, temperatures on the order of 350° C. to 600° C., and higher, and pressures on the order of 13,000 psi (pounds per square inch absolute) to 23,000 psi, and higher, have been employed to produce these materials. Such extreme conditions, of course, are not conducive to commercial or large-scale operations, and though the purity and quality of these materials over the natural products have been improved to provide some advantages, the properties nonetheless did not appear of particular interest for use of these materials as catalysts. In large part, this is probably due to the relatively limited number of interesting specimens found in nature, the only major source of supply, to the low surface areas observed in the naturally-occurring forms of these materials, and to the only relatively modest gains made in synthesis even of the few of these materials which have been synthetically produced.

Nonetheless, it is the primary objective of the present invention to obviate these and other prior art difficulties.

A particular object is to provide a new and improved process for production of these layered complex metal silicates, or silicates formed of sheets of paired layers of $Si_2O_5$, or serpentine, fused together with layers of certain types of metal, or metals, chemically combined with hydroxyl ions.

A specific object is to provide such process which can be operated at low severity conditions, i.e., at temperatures and pressures considerably lower than heretofore possible, which process is capable of producing complex metal silicates resembling, or closely resembling, the chemical or physical composition, or both, of those found in nature as well as a spectrum of new and novel complex metal silicates which differ in chemical or physical composition, or both, from those found in nature.

Another object is to provide complex metal silicate and chrysotile compositions which differ in one or more of their chemical or physical characteristics, or both, from those compositions found in nature, or heretofore synthetically produced.

A further object is to provide complex metal silicates and chrysotiles which differ in one or more of their chemical or physical characteristics, or both, for direct or indirect use as catalysts, or catalytic agents, for use in hydrocarbon conversion reactions.

In addition to the many known usages of the layered complex metal silicates, supra, and the advantages offered by synthesis of these materials with greater adsorption and absorption capacities, and in high purity state, the present compositions can be used directly or modified by known techniques for use in hydrocarbon conversion reactions for improving the octane number of gasoline or converting relatively heavy hydrocarbons to light, lower boiling hydrocarbons, and including converting hydrocarbons by hydrogenation or dehydrogenation to saturate or unsaturate, in whole or in part, various species of molecular hydrocarbons. Among such hydrocarbon conversion processes are aromatization, isomerization, hydroisomerization, cracking, hydrocracking, polymerization, alkylation, dealkylation, hydrogenation, dehydrogenation, desulfurization, denitrogenation, and reforming.

It has now been found that layered complex metal silicates, particularly chrysotiles, of shape ranging from very thick wall tubes (substantially rods in character) through moderately thick wall tubes, thick wall tubes through thin wall tubes, and thin wall tubes through flakes can be synthetically prepared from soluble forms of silica, and certain metals or their oxides and hydroxides in alkaline medium, in critical concentration, at moderate temperatures and pressures. The layered complex metal silicates, including chrysotiles, formed in accordance with the present inventive process, and certain of the high surface area compositions of the present invention, are of crystalline structure defined chemically by repeating units represented by the following structural formula:

(I) $\quad [(1-x)M^{(a)} + xM^{(b)}]_n(OH)_4Si_2O_5 \cdot wH_2O$ where $M$ and $\overline{M}$ are selected from monovalent and multivalent metal cations, of valence ranging from 1 to 7, having an effective ionic radius [Goldschmidt radius, Effective Radii of Atoms and Ions from Crystal Structure, Page 108, Lange's Handbook of Chemistry, Tenth Edition, Handbook Publishers, Inc., Sandusky, Ohio] ranging from about 0.5 to about 1 A., and preferably from about 0.57 to about 0.91 A., $x$ is a number ranging from 0 to 1, this number expressing the atomic fraction of the metals $M$ and $\overline{M}$, $a$ is the valence of $M$, $b$ is the valence of $\overline{M}$, $n$ is a number equal in value to that defined by the ratio $6/[a(1-x)+bx]$, and $w$ is a number ranging from 0 to 4. Some species of these complex metal silicates have been found to exist in nature, and some species have been synthetically produced. Some species differ chemically from those found in nature, or those heretofore synthetically produced, and others, though chemically similar, possess different physical properties.

Illustrative of this type of complex silicate, in any event, is the form of serpentine known as chrysotile the dehydrated form of which has the idealized structural formula $Mg_3(OH)_4Si_2O_5$. The formula is idealized in the sense that chrysotiles, as other minerals, rarely, if ever, appear in nature in pure form but contain very small amounts of impurities such as iron, aluminum, and the like, substituted for magnesium, and occasionally for silicon. Chrysotile is a mineral derived from multiple layers of $Si_2O_5$, or serpentine, condensed with $Mg(OH)_2$, or brucite layers, this material existing in nature as cylindrical shaped rods or thick tubes. The naturally-occurring mineral antigorite is also illustrative of such complex silicate having the idealized formula $Mg_3(OH)_4Si_2O_5$. In nature, this material is also constituted of $Si_2O_5$, or serpentine, condensed with layers of $Mg(OH)_2$, or brucite. This material, however, is found in nature in the form of plates of undulating shape. Ortho serpentine, $Mg_3(OH)_4Si_2O_5$, a six-layer serpentine, is also found in nature, as is lizardite, $Mg_3(OH)_4Si_2O_5$, which is a one-layer serpentine. Both of these materials are found in the form of plates. Garnierite, a nickel substituted form of layered complex silicate, $Ni_3(OH)_4Si_2O_5$, is found in nature in the form of tubes. Synthetic garnierite has also been prepared by prior art workers, nickel having been substituted for magnesium in conventional synthetic chrysotile formulations. Cobalt chrysotile, $Co_3(OH)_4Si_2O_5$, has been prepared in similar manner. Insofar as known, however, attempts to prepare other useful forms of synthetic chrysotiles have failed.

The process of this invention can be employed not only to produce complex metal silicates of known chemical composition, but also complex metal silicates of new and novel chemical composition. It can also be used to produce both old and new chemical compositions with new, different, and unique physical properties, particularly as regards high surface area compositions.

Chrysotiles of known chemical composition are thus included in the foregoing formula (I), but even these compositions can be produced with entirely different physical properties, especially as regards surface areas. Essentially pure forms of chrysotile, defined in the foregoing formula as those species wherein $x$ does not exceed about 0.03 and preferably about 0.01, are thus magnesium chrysotile $Mg_3(OH)_4Si_2O_5$, with surface areas of above about 110 m²/g, nickel chrysotile, $Ni_3(OH)_4Si_2O_5$, with surface areas of above about 125 m²/g, and cobalt chrysotile, $Co_3(OH)_4Si_2O_5$, with surface areas above about 190 m²/g, the maximum surface areas achieved by prior art practice, can thus be produced pursuant to the practice of this invention. Other forms of chrysotile, included within the scope of this formula, can also be produced pursuant to this invention but with surface areas exceeding 110 m²/g, the maximum surface area heretofore achieved by prior practice (exclusive of the nickel and cobalt chrysotile species). Preferred forms of these high surface area species are those in the form of thin wall tubes of surface area ranging about 150 m²/g to about 250 m²/g, preferably from about 160 m²/g to about 200 m²/g, and those in the form of thin flakes of surface area ranging from about 250 m²/g to about 600 m²/g, and higher, preferably from about 250 m²/g to about 450 m²/g.

Pursuant to the practice of the present process, compositions can be prepared which differ in their chemical structure from heretofore existing compositions in that they contain two or more metals in significant concentration within the crystalline structure, and include, particularly, such compositions of high surface areas. These new compositions are of crystalline structure defined by repeating units represented by the following structural formula:

(II) $\quad [(1-x)M^{(a)} + xM^{(b)}]_n(OH)_4Si_2O_5 \cdot wH_2O$ wherein $M$ and $\overline{M}$ are metal cations having an effective ionic radius (Goldschmidt) ranging from about 0.5 to about 1 A., $a$ expresses the valence of $M$ and is equal to 2, $b$ expresses the valence of $\overline{M}$ and is an integer ranging from 1 to 7, and preferably is an integer ranging from 2 to 4, $x$ is a number ranging from 0.01 to 0.50, preferably from 0.03 to 0.20, and $n$ is a number ranging from 2.5 to 3.3, and preferably from 2.7 to 3.0. $w$ is a number ranging from 0 to 4. Exemplary of such compounds are $(0.2\ Ni + 0.8\ Mg)_3(OH)_4Si_2O_5 \cdot wH_2O$; $(0.1\ Al + 0.9\ Mg)_{2.86}(OH)_4Si_2O_5 \cdot wH_2O$; $(0.05\ W + 0.95\ Ni)_{2.73\ (OH)4}Si_2O_5 \cdot wH_2O$; and $(0.1\ Li + 0.9\ Mg)_{3.16}(OH)_4Si_2O_5 \cdot wH_2O$.

In these formulas M and $\overline{M}$ can thus be the same or different metals, and these can be of the same or different valence. The complex metal silicates can thus contain essentially one metal, or can contain two or more different metals in varying concentrations. In formula (I) M and $\overline{M}$ can be monovalent or multivalent metals of valence ranging from 1 to 7, while in formula (II) M is a divalent metal. The valence of $\overline{M}$ can range from 1 to 7. $\overline{M}$ of the formulas can also represent more than one monovalent ormultivalent metal, though substantially bimetallic compositions are generally preferred. The cationic form of the metal of the crystal must have an effective ionic radius substantially within the ranges described. Illustrative of metals utilized in acceptable cationic form, which can be selected from the Periodic Table of the Elements (E. H. Sargent & Company, copyright 1962 Dyna Slide Co.), are Group IA metals such as lithium, Group IB metals such as copper, Group IIA metals such as magnesium, Group IIB metals such as zinc, Group IIIB metals such as scandium, Group IIIA metals such as aluminum and gallium, Group IVB metals such as titanium and zirconium, Group VB metals such as vanadium, Group VIB metals such as chromium, molybdenum and tungsten, Group VIIB metals such as manganese and Group VIII metals such as iron, cobalt, nickel, palladium and platinum.

Preferred metals from these classes are magnesium, nickel, cobalt, chromium, molybdenum, tungsten, palladium, platinum and aluminum. Magnesium is preferred because of the relative ease of formation of the complex magnesium silicates which are useful as catalysts, and such silicates are quite useful as support materials, Pursuant to the process of this invention, other complex metal silicates are formed by substitution of other metal ions for the magnesium. Nickel and cobalt are also preferred metals with known catalytic properties, and can be readily substituted for magnesium, in whole or in part to provide highly active hydrogenation components in formation of fuels processing catalysts. Chromium is found highly suitable for formation of other complex metal silicates of the type herein described, and can be used to produce aromatization catalysts of good quality for use in fuels processes. Molybdenum is found useful, especially for the production of hydrodesulfurization and reforming catalysts. Tungsten and palladium are useful for formation of hydrocracking catalysts. Platinum is useful in forming reforming catalysts and aluminum for use in the production of catalytic cracking catalysts. In general, the synthetic chrysotiles of this invention provide a means of maintaining a metal in dispersed form on a silica surface to provide greater activity, this being contrasted with the addition of metals to such preformed support materials which leaves something to be desired in maintaining this high state of dispersion.

Complex metal silicates of these types can be synthetically prepared in hydrated form in very high yields from solution or gels, and then converted to dehydrated form by subjection to heat, as desired. The complex metal silicates are prepared by reacting a metal cation source with a silica source in proportions approximating the stoichiometric complex metal silicate composition, in an alkaline medium of pH ranging from about 10, and higher, and preferably at pH ranging from about 12 to about 14, at moderate temperatures and pressures. Suitably, the reaction is conducted at temperatures ranging below 300° C., preferably at temperatures ranging from about 200° C. to about 275° C. Lower temperatures can be used but the reaction proceeds quite slowly. Pressures in many systems are suitably autogeneous, i.e., maintained at the vapor pressure of the liquid solvent at the temperature of operation. This is especially true of aqueous mediums, these mediums being especially preferred. Pressures as high as 12,000 psi, and higher, can be employed, but generally it is commercially unfeasible to operate at pressures above about 1000 psi. Preferably, pressures ranging from about 200 psi to about 1000 psi, and more preferably pressures ranging from about 400 psi to about 800 psi are maintained upon the reaction system. Reaction time ranges generally from about 0.5 to about 72 hours, and preferably from about 4 to about 24 hours.

The compositions of the present invention encompass: (a) layered complex metal silicates defined by Formula (I) where the surface area of the composition ranges above about 110 m²/g, except as regards nickel chrysotile, $Ni_3(OH)_4Si_2O_5$, and cobalt chrysotile, $Co_3(OH)_4Si_2O_5$, but encompasses these latter species wherein the surface areas range above about 125 m²/g and 190 m²/g (BET Method), respectively; and (b) layered complex metal silicates defined by Formula (II), the higher surface area compositions being especially preferred. The most preferred compositions of the present invention, because they are admirably suitable for direct or indirect use as hydrocarbon conversion catalysts or catalyst supports, are the chrysotiles. For purposes of this invention, chrysotiles are those compositions defined in Formula (I) and Formula (II) wherein the $Si_2O_5$, or serpentine layers of the repeating unit which form the crystals, are of smaller length or diameter than the associated metal hydroxide layers to which the serpentine layers are adjoined. This characteristic structure is distinguishable from other layered complex metal silicates, and other crystalline substances, by X-ray diffraction patterns whether the crystal structures exist as tubes or flakes.

X-ray powder diffraction data for the two physically different forms of chrysotile are as given below:

X-Ray Diffraction Patterns for Chrysotile

| Tubes | | Flakes | |
|---|---|---|---|
| d(A) | I | d(A) | I |
| 7.50 ± .40 | s | — | — |
| 4.50 ± .20 | m | 4.55 ± .20 | m |
| 3.67 ± .13 | s | 3.22 ± .10 | w |
| 2.58 ± .06 | m | 2.59 ± .06 | m |
| 2.46 ± .06 | m | —± | — |
| 2.10 ± .04 | w | — | — |
| 1.725 ± .025 | w | 1.73 ± .025 | w |
| 1.535 ± .015 | m | 1.54 ± .015 | m |
| 1.320 ± .010 | w | 1.31 ± .010 | w |
| 1.300 ± .010 | w | | |

In obtaining the X-ray powder diffraction pattern, standard procedures were employed. The radiation source was the K-alpha doublet for copper. A Geiger counter spectrometer with a strip chart pen recorder was used in recording the data. The peak heights I, and the positions as a function of 2 $\theta$, where $\theta$ is the Bragg angle, were read from the spectrometer chart. From these, the relative intensities I were observed. Also, the interplanar spacing, $d$, in Angstrom Units, corresponding to the recorded lines, were determined by reference to standard tables. In the above table, the more significant interplanar spacings, i.e., $d$ values, for chrysotile tubes and flakes respectively, are given. The relative intensities of the lines are expressed as $s$ (strong), $m$ (medium) and $w$ (weak).

In chrysotile it is thus known that the mineral is formed of paired serpentine and brucite layers which do not match, and hence the crystal is strained. Consequently, this gives rise to different physical forms and shapes inasmuch as relief from the strain is gained by a curl of the crystal along its long axis so that chrysotile exists in nature as cylindrical shaped rods or thick wall tubes. The thick wall tubular structure has been observed in synthetic forms of chrysotile In the present process, the complex metal silicates are also formed as thick wall tubes, thin wall tubes, curls or flakes, as desired, from gels as paired layers of different sizes. Layers of silicon-oxygen sheets are combined with layers of hydroxyl groups cemented to the silicon-oxygen sheets by metal cations. Each of the repeating units, considering for convenience the anhydrous form, is thus formed of a layer of serpentine, or $Si_2O_5$, and an adjacent larger sized layer of metal chemically combined with hydroxyl ions, or $[(1-x)M^{(a)} + xM^{(b)}]_n(OH)_4$, to which the former is fused. The paired, fused metal-hydroxyl ions and serpentine layers are held together by very strong forces of attraction, while the repeating units of paired layers per se are held together by weaker forces of attraction. A serpentine or $Si_2O_5$ layer is formed of a sheet of linked $SiO_4$ tetrahedra, three oxygen atoms of each $SiO_4$ being shared with adjacent $SiO_4$ tetrahedra, in the same layer. The vertices of all the tetrahedra point in the same direction, or outwardly for a rod or tube structure. In the metal-hydroxyl layer or $[(1-x)M^{(a)} + xM^{(b)}]_n(OH)_4$ layer, one-third of the oxygen atoms are oxygen ions $[O^{-2}]$ which are shared with silica tetrahedra of the adjacent serpentine or $Si_2O_5$ layer. The remaining oxygen atoms are hydroxyl groups, and these are associated only with M or M cations. Thus, the M or M cations are surrounded by six ions, four hydroxyl groups, or ions, and two oxygen ions in a case where the metal is a divalent cation such as magnesium.

These forms of layered complex metal silicates can thus be logically considered as chrysotiles, or substituted chrysotiles, since they possess the chrysotile structure; and have been so characterized in the art in the forms known to exist—viz., as chrysotile, or magnesium chrysotile, $Mg_3(OH)_4Si_2O_5$, as nickel chrysotile, $Ni_3(OH)_4Si_2O_5$ and as cobalt chrysotile, $Co_3(OH)_4Si_2O_5$. Using the Pauling notation, a repeating unit of the crystalline structure comprising five tiers of ions (1 through 5) can be conveniently illustrated as follows:

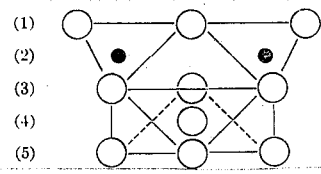

Tier 1 is constituted entirely of oxygen ions. Tier 2, constituting the tetrahedral cation position, is essentially constituted of silicon ions. Tier 3 is constituted of both oxygen and hydroxyl ions—viz., two oxygen ions and a hydroxyl ion. Tier 4, which constitutes the octahedral cation position, is constituted of a monovalent or multivalent metal cation M or M. This is the primary cation site for substitution of the various metals represented by M and M into the chrysotile structure. Where only magnesium is contained in the octahedral cation position, the chemical structure is that of chrysotile; and where nickel or cobalt is wholly substituted for magnesium, the chemical structure is also that heretofore produced synthetically and known as nickel chrysotile (or garnierite) and cobalt chrysotile. Tier 5 is constituted entirely of hydroxyl ions. The serpentine or $Si_2O_5$ layer is constituted of those tiers of ions ranging from 1 through 3, and the metal-hydroxyl ion layer is constituted of those tiers of ions ranging from 3 through 5. Two of the ions of Tier 3 are shared between the serpentine layer and the metal-hydroxyl ion layer, while the third ion is more identifiable with the metal-hydroxyl ion layer. In the repeating unit Tier 1 contains 3 oxygen atoms, Tier 2 contains 2 silicon atoms, Tier 3 contains 2 oxygen atoms and 1 hydroxyl ion, Tier 4 contains 3 magnesium ions and Tier 5 contains 3 hydroxyl ions. While it is not apparent from accepted Pauling notation, the two layers are not of the same dimension, the metal-hydroxyl ion layer being of greater length than the serpentine layer so that there is a misfit of the two layers, and hence a strain between the paired layers which form a repeating unit.

The metal-hydroxyl ion layer of a repeating unit is of greater area (and length at least in one dimension) than an adjoining serpentine layer, the misfit between the two layers producing a stress-strain relationship which causes the layers to curve in a direction such that the concave side of the metal-hydroxyl ion layer adjoins the convex side of the serpentine layer. When the chrysotile is in tubular shape, this means that the structure is of coil shape, or formed of a series of concentric-like paired layers of the repeating units and the serpentine layer is the smaller diameter member of the paired layers.

The misfit between the paired layers in conjunction with the pH of the reaction medium at the time the crystals are formed is believed to give rise, at least in part, to the present inventive process. Pursuant to the practice of the present inventive process, in any event, it has been found that a definite relationship exists between the pH of the alkaline medium and the nature and physical form of the crystalline materials which are formed, as well as with respect to the temperature and pressure at which the reactions can be conducted. By conducting the reactions at a pH of above about 10, and preferably at from about 12 to 14, it has been found that the reactions can be conducted at considerably lower temperatures and pressures than heretofore believed possible. This not only makes large scale commercial operation feasible but, additionally, provides a means of product quality control. It has thus been found that pH can be used to provide complex metal silicates of the types described in physical forms and shapes ranging generally from cylindrical shaped rods through thick wall tubes, from thick wall tubes through thin wall tubes, and from thin wall tubes through flakes. On the one hand, where the chemical species is known to exist, some of the physical forms are found in nature, or have heretofore been synthetically produced. Others differ physically from the natural forms, or forms heretofore synthetically produced. On the other hand, some of these materials are chemically as well as physically different forms. For example, chrysotile, $Mg_3(OH)_4Si_2O_5$, is found in nature in the form of rods and thick wall tubes of low surface area. This material has also been heretofore produced synthetically as thick wall tubes with maximum surface area of 110 $m^2/g$. Thin wall tubes of higher surface areas are unknown. Other minerals having the same chemical structure as chrysotile are known to exist in nature, e.g., antigorite. It exists in nature as platelets of undulating shape, and generally possesses a very low surface area. Garnierite, $Ni_3(OH)_4Si_2O_5$, and a cobalt form of chrysotile, $Co_3(OH)_4Si_2O_5$, have been synthetically produced, but as specimens of surface area ranging as high as 125 $m^2/g$ and 190 $m^2/g$, respectively.

A feature of this process is that by judicious selection of pH, surface areas can be improved considerably, generally at least two-fold and ranging as high as almost ten-fold over the corresponding natural products where they exist. The surface areas of these materials can thus be controlled within conventional ranges, e.g., in the case of magnesium chrysotile up to about 110 $m^2/g$, or can be increased above 110 $m^2/g$. Preferably, tubes can be formed which have surface areas within the range of from about 150 $m^2/g$ to about 250 $m^2/g$, and higher, and more preferably within the range of from about 160 $m^2/g$ to about 200 $m^2/g$ (B.E.T. method; absorption of $N_2$ at its normal boiling point). Preferably, flakes can be formed with surface areas ranging from about 250 $m^2/g$ to about 600 $m^2/g$, and more preferably from about 250 $m^2/g$ to about 450 $m^2/g$. The nickel form of chrysotile, $Ni_3(OH)_4Si_2O_5$, and the cobalt form of chrysotile, $Co_3(OH)_4Si_2O_5$, in the form of tubes and flakes, can be produced with surface areas greater than 125 $m^2/g$ and 190 $m^2/g$, respectively, and preferably within the higher range of limits described. It is found that at different pH levels the character of the crystals can be controlled so that a given chemical specimen can be formed in the shape of rods, thick wall tubes, curls, or thin flakes and that surface areas can be controlled during the transition, surface area increasing as pH is lowered to favor, directionally, the production of rods through thick wall tubes, thick wall tubes through thin wall tubes, and thin wall tubes through flakes.

In general, in the formation of a species of chrysotiles at controlled conditions, as pH is lowered the tube walls get thinner, and the thin wall tubes generally yield surface areas no greater than about 200 $m^2/g$ to about 250 $m^2/g$. As pH is further lowered to obtain higher surface areas, the thin wall tubes form curls (or malformed tubes), and then break apart and form higher surface area flakes, the walls of which, directionally, also become thinner as pH is lowered. Thus, at constant temperature and pressure, specimens of definite character are formed at a selected pH. The actual transition points vary to some extent dependent largely upon the nature of the metal, or metals, used in formation of the complex metal silicate. The thickness of the walls of the tubes can thus be directly controlled by the selected pH. Thin wall tubes of only a few paired layers, e.g., 4 to 8 in thickness, can be formed. Such tubs ranging from about 20 A. to about 70 A., and preferably from about 28 A. to about 45 A., in thickness provide tubes of far greater inside diameter than occurs in the corresponding natural products, providing far greater adsorption space and accessibility for catalytic contact by reactant materials upon catalytic surfaces. For example, in sharp contrast to naturally-occurring magnesium chrysotile which exists in a cylindrical or rod-like form or in a thick wall tubular form having an inner diameter ranging from about 20 A. to 50 A., high surface area chrysotile compositions of this invention exist as tubes having inner diameters above 50 A., preferably from about 60 A. to about 100 A., and higher. The accessibility and high concentration of large pore openings which exist in these materials are quite important in considering the availability of surface areas for catalytic purposes. At surface areas above about 250 $m^2/g$ the chrysotile compositions of this invention are usually formed as relatively thin flakes. The thin flakes, because of their ultra-high surface areas, are the most preferred compositions for use in most hydrocarbon conversion reactions.

As suggested, as the pH is further decreased, at the selected conditions, the tubes begin to curl and then break apart to form thin flakes of very high surface area. The flakes range in thickness from about 15 to about 50 A., and preferably from about 20 to about 30 A.

It is feasible, at these low severity process conditions, to synthesize new and novel complex metal silicates from solutions containing reactive silicates, and reactive forms of the desired metal, e.g., soluble salts, or oxides and hydroxides. The reactants are combined in alkaline medium at moderate temperature and pressure. The complex metal silicates are formed in two steps. In a first step, a synthesis gel is formed by coprecipitation of the metal oxides or hydroxides with hydrous silica gel in alkaline medium. In a second step, the gel is heated at from about 200° C. to about 350° C., and preferably from about 250° C. to about 275° C., so that the chrysotile product is crystallized from the synthesis gel with rejection of excess water and soluble salts which are removed by filtration and washing. At the time of formation of the synthesis gel, the composition of the metal hydroxide layer of the crystal is fixed by selecting the concentration of metals to vary the ratios of $M/\overline{M}$, as desired. The structures are useful as catalysts, or can be further modified after initial formation, as desired, by cation exchange, as with ammonia and selected metal cations, or by impregnation with metal anions or cations, or both, or by a combination of ion exchange and impregnation.

The process improvements whereby previously existing or naturally-occurring complex metal silicates, as well as new and novel forms of complex metal silicates, can be made is effected by the use of highly alkaline mediums, of critical pH. High alkalinity causes the reaction to proceed at substantially milder conditions than heretofore believed possible. This favorable effect, which makes it generally unnecessary to conduct the reactions at the higher conventional temperatures and pressures, is not completely understood. The highly alkaline medium is employed to cause breakage of the silicon oxygen bonds, or depolymerization of the $SiO_2$ components, so that the latter become more freely migratory within the solution or gel even at relatively low temperatures and pressures. In any event, it is found that alkali concentration can be varied, as desired, in the reaction system to provide a variety of complex metal silicates, some resembling products heretofore found in nature or produced by other synthesis techniques, either in their chemical or physical characteristics, or both, and many products heretofore unknown as regards either their chemical or physical characteristics, or both.

The nature of the reaction by virtue of which pH can be used to control the physical forms of the chrysotiles produced is thus not entirely understood, but it would appear that the strain produced by the misfit of the unequal sized serpentine, $Si_2O_5$, and the larger metal-hydroxyl ion layers is in part responsible for this phenomenon. Thus, at the selected low severity conditions, the strain is greatest on the layers fartherest away from the equilibrium diameter. At a given intermediate pH, crystals assume the form of thin wall multilayer structures of only a few layers thickness. These crystals are of high surface area and possess relatively large internal openings. At higher pH, the walls are thick, or the structure is even rod-like. At lower pH, the strain between the paired layers causes the tube to break apart to form high surface area, thin flakes. The use, or substitution, of metal cations of different size into the octahedral cation position, which is believed to be the primary cation site for substitutions, thus further alters the stress-strain relationship between the forming crystals. Hence, it would not be expected that single set of parameters could be used to define the transition points, or zones, for the crystals of all of the different metals which can be substituted at the primary cation sites. It is found generally, however, that cations which most closely approach in size the effective ionic radius of magnesium are most readily substituted, and in highest concentration. It also appears that the size of the larger metal hydroxide layer of a crystal structure is directly related to the size of the cation substituted for magnesium and hence the stress-strain relationship altered so as to effect the curvature of the structure caused by the misfit between the larger metal hydroxide layer and the adjacent smaller serpentine layer. Whatever the explanation, however, the technique is admirably suitable for producing whole new families of high surface area crystals, and even families of crystals chemically different from those found in nature, or those heretofore synthetically produced.

Various alkaline materials can be used in the practice of this invention, providing they possess sufficient alkalinity to raise the reaction medium to the necessary pH, do not react to a significant extent with the forming complex metal silicates, with the intermediate materials, precipitate the silica, or decompose to gaseous products. Most preferred of these alkaline materials, for these reasons, are the alkali metal and alkaline earth metal hydroxides, exemplary of which are Group IA metal hydroxides such as sodium hydroxide, potassium hydroxide, cesium hydroxide and the like, and Group IIA metal hydroxides such as barium hydroxide, strontium hydroxide and the like. A satisfactory Group IIIA metal hydroxide is thallium hydroxide. Various other materials such as tetra alkyl ammonium hydroxides, e.g., tetra methyl ammonium hydroxide, can be employed.

Various sources of silica can be employed in the present process, these including essentially any of the conventional, widely used silica sources such as silica per se, diatomaceous earths, silica hydrogel, silica hydrosol, alkali metal silicates, e.g., sodium silicate, and the like. Particularly preferred sources of silicates are silica sol, silica gel, and sodium silicate solution (water glass).

Virtually any form of compound which is sufficiently soluble and compatible with the reaction mixture, which contains the desired metal, can be used as a source of the metal. Soluble salts of the metals, or mixtures of such salts, e.g., halides, sulfides, sulfates, nitrates, carbonates, acetates, phosphates, or the like, can be used to supply the desired metal, or metals, in formation of the complex metal silicates. Exemplary of such salts are lithium chloride, lithium bromide, cupric chloride, cupric sulfate, magnesium chloride, magnesium bromide, magnesium sulfate, magnesium sulfide, zinc acetate, zinc chloride, zinc bromide, scandium bromide, scandium sulfate, aluminum chloride, aluminum bromide, aluminum acetate, aluminum nitrate, aluminum phosphate, aluminum sulfate, gallium nitrate, gallium sulfate, titanium bromide, titanium trichloride, titanium tetrachloride, titanium oxydichloride, zirconium dibromide, zirconium sulfate, zirconyl bromide, vanadium bromide, vanadium trichloride, vanadyl sulfate, chromic acetate, chromic chloride, chromic nitrate, chromic sulfate, molybdenum oxydibromide, tungsten trisulfide, manganous sulfate, ferric chloride, ferrous chloride, ferrous sulfate, cobaltous nitrate, cobaltous sulfate, nickel chloride, nickel bromide, palladium chloride, palladium sulfate, platinic tetrachloride, and the like. Many hydroxides, oxides, or oxygenated anions of these various metals can also be employed, and these are particularly useful where it is desirable to increase the pH of the solution over and above that practical by a relatively weak base. Illustrative of such compounds are magnesium hydroxide, magnesium oxide, sodium tungstate, sodium molybdate, sodium chromate, sodium vanadate and the like. Other metal sources can also be employed, e.g., chloroplatinic acid, chloropalladous acid and the like.

The relative amounts of the silica and metal sources are most easily determined by the stoichiometry of the desired product, though the use of exact stoichiometric amounts of these materials in a given reaction mixture is unnecessary. Typically, the sources of silica and metal are used in quantities sufficient to provide a reaction mixture having a metal, or mixture of metals (calculated as the oxide or oxides), relative to the silica (calculated as the oxide) in mole ratio ranging from about 1 to about 2, and preferably from about 1.4 to about 1.6.

The invention will be more fully understood by reference to the following data, selected to demonstrate the more salient features of the novel process for preparation of these complex metal silicates, new and novel compositions, and the process of their use in various hydrocarbon conversion reactions.

A first series of runs are presented to demonstrate the manner in which pH can be used to control the production of the complex metal silicates. Chrysotile, $Mg_3(OH)_4Si_2O_5$, is first selected to illustrate complex metal silicates of chemical type which, though found in nature and heretofore synthetically produced, can be nonetheless produced in new, different, and unique physical forms.

EXAMPLES 1-11

In each of the runs tabulated in Table I, the silica source comprises either colloidal silica sol, 150 A. particle size, sold under the Dupont tradename as "Ludox LS-30," or sodium metasilicate. The silica source is added to an aqueous solution of a suitable magnesium source, i.e., a magnesium salt, in concentration of 50 parts by weight of the salt in 100 parts by weight of water. In order to produce the desired pH, to a solution or gel is then added various amounts of an alkali metal hydroxide, from a solution made up of 60 parts by weight of the alkali metal hydroxide per 100 parts by weight of water, with stirring for about 5 minutes at 25° C. and atmospheric pressure. Typically, as is demonstrated, the silica and magnesium sources are used in quantities sufficient to provide a reaction mixture having a $MgO/SiO_2$ mole ratio ranging from about 1.0 to about 2.0, but preferably of about 1.5. The pH of the solution ranges from 10 to 14, as determined by the amount of alkali metal hydroxide added.

The resultant mixtures are placed, in separate series of runs, in an autoclave heated at 250° C. at pressure of 570 psi. After a period of 24 hours, the resultant insoluble products obtained in high yield, substantially stoichiometric, are cooled, filtered, washed with 10 volumes of water to produce low sodium chloride levels, and dried at 120° C. in an oven. All specimens are positively identified by X-ray diffraction data as chrysotile.

TABLE I

Synthesis of Chrysotile

| Ex. | Silica Source | Reaction Mixture Compositions Mg Source | $MgO/SiO_2$ | $Na_2O/SiO_2$ | $H_2O/SiO_2$ | Surface Area $m^2/g^a$ | Physical form of compositions |
|---|---|---|---|---|---|---|---|
| 1 | LS-30[b] | $MgCl_2$ | 1.5 | 2.5 | 42 | 72 | Tubes |
| 2 | LS-30 | $MgSO_4$ | 1.5 | 2.5 | 64 | 92 | Tubes |
| 3 | LS-30 | $MgCl_2$ | 2 | 2.5 | 44 | 73 | Tubes |
| 4 | LS-30 | $MgCl_2$ | 1.5 | 1.5 | 42 | 249 | Tubes |
| 5 | Metasilicate | $MgCl_2$ | 1.5 | 2.5 | 65 | 93 | Tubes |
| 6[c] | LS-30 | $MgCl_2$ | 1.5 | 2.5 | 44 | 129 | Tubes |
| 7[d] | LS-30 | $MgCl_2$ | 1.5 | 2.5 | 44 | 132 | Tubes |
| 8 | LS-30 | $MgCl_2$ | 1.5 | 1.5 | 42 | 228 | Tubes |
| 9 | LS-30 | $MgCl_2$ | 1.5 | 1.0 | 51 | 468 | Flakes |
| 10[e] | LS-30 | $MgCl_2$ | 1.5 | 1.0 ($K_2O/SiO_2$) | 51 | 444 | Flakes |
| 11[e] | LS-30 | $MgCl_2$ | 1.5 | 1.5 ($K_2O/SiO_2$) | 51 | 467 | Flakes | a. Surface area, and all surface areas reported and claimed herein, determined by BET Method: $N_2$ adsorption at its normal boiling point. Shell Development Company, "Simplified Method for the Rapid Determination of Surface Area by Nitrogen Adsorption," Report No. S-9815R, May 3, 1945.
b. Colloidal silica sol (150 A) particle size sold under the trade name "Ludox LS-30."
c. Reaction temperature of 275°C.
d. Reaction at 275°C. for 48 hours.
e. KOH used as the alkali metal hydroxide.

A definite relationship is thus found to exist between the pH, or caustic mole ratio, and the surface area of the chrysotile produced. These result, graphically shown by reference to the attached figure, show that exceptionally high chrysotile surface areas are produced when alkali metal hydroxide is used in limited quantity to produce a reaction mixture having an alkali metal oxide-to-silica mole ratio below about 1.75, this corresponding to a pH of about 13.

Referring further to the figure, it is found that long tubular shaped crystals with thick walls, openings of relatively small diameter, and low surface area are produced at $Na_2O/SiO_2$ ratios ranging from about 2.5 to about 2.0. The wall thickness of such crystals thus ranges from about 100 to about 50 A., the internal diameter of the openings from about 30 to about 60 A., and the surface area from about 70 to about 120 $m^2/g$. At $Na_2O/SiO_2$ ratios between about 2.0 and 1.5, thin wall tubes with internal openings of relatively large diameters and high surface areas are formed. The wall thicknesses of these types of tubes thus range from about 50 to about 30 A., the internal diameter of the tubes from about 60 to about 150 A., and the surface area from about 120 to about 250 $m^2/g$. Within the range of $Na_2O/SiO_2$ ratios beginning at about 1.5, the thin wall tubes apparently break down to form porous flakes. Thus, at $Na_2O/SiO_2$ ratios ranging about 1.5 and lower, thin flakes are formed. Such flakes range in thickness from about 30 to about 20 A., and have surface areas which range from about 250 to about 600 $m^2/g$, and higher.

These data show that pH can be controlled to ameliorate process conditions, as well as to optimize the quality of the products. The process also makes it feasible to produce complex mixed metal silicates, as demonstrated by the following selected data.

EXAMPLE 12

A cobalt substituted chrysotile is prepared in the following manner: 50 parts by weight of Ludox LS-30 (described above) is added with stirring to a solution containing 9 parts by weight of $CoCl_2 \cdot 6H_2O$, 68.6 parts by weight of $MgCl_2 \cdot 6H_2O$ and 150 parts by weight of water. A solution consisting of 30 parts by weight of NaOH and 50 parts by weight of water is then added to the aforedescribed mixture and stirred at 25° C. and atmospheric pressure for about 5 minutes. The resulting mixture is then placed in an autoclave and heated to 250° C. for about 24 hours. The product is then cooled, washed and dried using the procedure given with reference to the foregoing examples. The product recovered, which is in the physical form of tubes, is a substituted chrysotile (identified by X-ray diffraction) having about 10 percent of the magnesium cations replaced with cobalt cations and having a surface area of about 267 $m^2/g$.

EXAMPLES 13-21

The following series of data, given in Table II, is illustrative of additional runs for the preparation of substituted mixed-metal forms of chrysotiles. All specimens are positively identified by X-ray diffraction data as chrysotile.

TABLE II.—SUBSTITUTED CHRYSOTILES

| Example | Percent of Mg replaced with metal cation | Metal cation source | Mg source | Total metal cation/SiO$_2$ | Na$_2$O/SiO$_2$ | H$_2$O/SiO$_2$ | Reaction conditions, hours at 250° C. | Surface area, M$^2$/g. | Physical form of compositions |
|---|---|---|---|---|---|---|---|---|---|
| 13 | 20% Ni | NiSO$_4$ | MgSO$_4$ | 1.5 | 1.5 | 58 | 16 | 260 | Curls and flakes. |
| 14 | 100% Ni (Garnierite) | NiSO$_4$ | | 1.5 | 1.25 | 58 | 24 | 338 | Flakes. |
| 15 | 20% Co | CoCl$_2$·6H$_2$O | MgCl$_2$ | 1.5 | 2.5 | 52 | 24 | 122 | Tubes. |
| 16 | 10% Co | CoCl$_2$·6H$_2$O | MgCl$_2$ | 1.5 | 1.25 | 63 | 24 | 403 | Flakes. |
| 17 | 10% Fe | FeCl$_2$·6H$_2$O | MgCl$_2$ | 1.5 | 1.5 | 52 | 24 | 398 | |
| 18 | 10% Mn | MnCl$_2$·4H$_2$O | MgCl$_2$ | 1.5 | 2.5 | 52 | 66 | 88 | Tubes. |
| 19 | 10% Cu | CuCl$_2$·2H$_2$O | MgCl$_2$ | 1.5 | 1.5 | 47 | 24 | 311 | Flakes. |
| 20 | 10% Cr | CrCl$_3$·6H$_2$O | MgCl$_2$ | 1.5 | 2.5 | 52 | 65 | 356 | Do. |
| 21 | 10% Zn | ZnCl$_2$ | MgCl$_2$ | 1.5 | 2.5 | 47 | 24 | 166 | Tubes. |

*Molar basis.

The present low severity process makes it quite feasible to produce conventional materials, or entirely new materials—viz., materials which are different chemically or physically, or both—of wide variety suitable as supports or catalysts, or both, on a scale heretofore unknown. The production of chrysotiles is thus now possible at temperatures significantly below those employed heretofore. For example, Nesterchuk et al ("Zap Uses Mineralog Obshchestria 95" [1], 75–9 [1966]) and Roy et al ("American Mineralogist 39", 957,975, [1954]) have reported the synthesis of chrysotile at temperatures ranging from about 350° to 600° C., at conventional hydrothermal conditions requiring a pressure ranging from about 13,000 psi to about 23,000 psi. In contrast, production of chrysotile at 250° C., as described in the foregoing Example 12, requires pressures of only about 570 psi (vapor pressure of water at 250° C.), and will readily permit the large-scale manufacture of such chrysotiles.

AROMATIZATION

Certain of the complex metal silicates can be used per se as catalysts, or can be composited with various materials to form catalysts useful in aromatization of olefinic hydrocarbons, whether straight chain or branched chain, monoolefinic or polyolefinic and whether conjugated or unconjugated. For example, straight chain olefins can be converted to aromatic compounds, e.g., as in the conversion of hexene-1 and heptene-1 to benzene and toluene, respectively. While such process can be used for the conversion of olefins to aromatics for chemical uses, it is particularly important in petroleum fuels processing. This is so in that olefins have many undesirable properties in motor gasoline and can be converted to aromatics with higher octane number to produce superior gasoline, while simultaneously eliminating materials which contribute to gum formation and air pollution. In accordance with the present invention, however, higher octane number products can be obtained and substantial portions of the olefinic content of feeds converted into desirable aromatics, without significant conversion to lighter hydrocarbons.

Olefinic hydrocarbons containing from about 6 to about 12 carbon atoms are preferred, and these are aromatized according to the present invention by contacting a suitable feedstock with the catalyst at low pressures ranging, i.e., from about atmospheric to about 150 psi, and preferably at from about atmospheric pressure to about 75 psi. An inert gas, e.g., nitrogen, helium, methane, or the like, or hydrogen can be employed. Use of an inert gas offers certain advantages inasmuch as their use forces the reaction to proceed to completion since hydrogen is a product of aromatization. However, in certain cases, catalyst deactivation may occur and use of a moderate hydrogen pressure is quite beneficial to prevent catalyst activity decline. Temperatures ranging from about 300° C. to about 800° C., and preferably from about 450° C. to about 600° C., are used. High conversion of olefinic hydrocarbons with good selectivity to aromatics are obtained.

In preparation of preferred types of aromatization catalysts a transition metal, or mixture of such metals, is generally composited with a suitable base, as by impregnation of the base or crystallization of the base with a suitable metal hydroxide. The preferred transition metals which are dispersed upon a suitable base are Group VIII metals, illustrative of which is platinum, iridium, palladium, rhodium and including iron, cobalt and nickel. Group IB metals, preferably as their oxide, such as copper, silver and gold, can also be composited with the Group VIII metals. Other metals, preferably in the form of their oxides, can be impregnated or otherwise composited, either alone or in combination with the Group VIII metals as, e.g., Group VIB metal oxides such as chromium, molybdenum and tungsten. Preferred complex metal silicate bases are those chrysotiles formed in whole or in part of magnesium or aluminum, or both. Illustrative of such bases are thin wall tubes and flakes of $Mg_3(OH)_4Si_2O_5$. Preferably, the surface area of the tubular shapes range from about 110 m$^2$/g to about 250 m$^2$/g, and flakes range preferably from about 250 m$^2$/g to about 500 m$^2$/g and higher. Preferred materials of these types also are chrysotiles containing from about 2 to about 10 weight percent aluminum, and a corresponding amount of magnesium as described by Formula II.

Preferred chrysotiles useful per se as aromatization catalysts are those high surface area forms of thin wall tubes and flakes containing, besides magnesium, about 0.1 to 1 weight percent platinum, or from about 1 to 15 weight percent chromium oxide ($Cr_2O_3$), or from about 1 to 15 weight percent molybdenum oxide ($MoO_3$), or from about 1 to 15 weight percent tungsten, as the oxide.

EXAMPLES 22–23

To illustrate useful catalysts for aromatization, a series of selected data are set out below. In one instance, chromia is composited with magnesium chrysotile and, in another, platinum is composited with magnesium chrysotile to form aromatization catalysts. The chrysotile employed in each instance consists of flakes of 356 m$^2$/g, positively identified by X-ray diffraction data.

The chromia-magnesium chrysotile catalyst is prepared by dissolving chromium oxide in water to form an aqueous solution, and then adding same to the powdered magnesium chrysotile in amount sufficient to form paste. The wetted powder is stirred to form a paste, the paste containing 15 weight percent chromium oxide on magnesium chrysotile. The paste is then heated in an oven at 150° C. for 16 hours. The dry mass is then taken from the oven and crushed to a powder, and then calcined in air at 538° C. for 16 hours.

A portion of the catalyst composite is placed, as a fixed bed, in an upflow reactor and contacted at reaction conditions, as specified below, with a 50°–95° C. cut of catalytic naphtha feed.

Feed composition, process conditions and the composition of the effluent are tabulated below:

TABLE III

Process Conditions
Temperature, °C.  510
Pressure, psig    10
Gas               $N_2$
V/V/Hr.           1

| | Feed Composition, Wt. % | Liquid Product Composition, Wt. % |
|---|---|---|
| Alkylbenzenes | 4.02 | 5.83 |
| Polycyclics | 0.27 | 0.38 |
| Isoparaffins | 39.44 | 38.42 |
| n-Paraffins | 1.20 | 3.55 |
| Cyclic-$C_5$ | 10.92 | 12.89 |
| Cyclic-$C_6$ | 0.04 | 0.00 |
| Olefins | 30.40 | 29.19 |
| Diolefins | 13.70 | 9.74 |

From these data it is clear that the aromatics concentration is increased at least 45 percent, the percent concentration of olefins and diolefins in the feed decreasing in the product, while the concentration of alkyl benzenes increases from a value of 4.02 percent in the feed to 5.83 percent in the product.

In another demonstration, a 0.3 percent platinum-on-magnesium chrysotile catalyst is prepared by forming a paste by admixing the magnesium chrysotile with an aqueous solution of chloroplatinic acid, drying same in an oven at 150° C. for 16 hours. The material is calcined at 1000° F. in air for 16 hours.

A portion of the catalyst composite is placed, as a fixed bed, in an upflow reactor and reduced in 1 atmosphere of $H_2$ at 1000° F. The temperature is then lowered to 950° F. and the gas switched to $N_2$. The catalyst is then contacted with a 50°–95° C. cut of a cat naphtha feed.

Feed composition, process conditions and the composition of the effluent are tabulated below:

TABLE IV

Process Conditions
Temperature, °C.  510
Pressure, psig    10
Gas               $N_2$
V/V/Hr.           1

| | Feed Composition, Wt. % | Liquid Product Composition, Wt. % |
|---|---|---|
| Alkylbenzenes | 4.02 | 7.70 |
| Polycyclics | 0.27 | 0.61 |
| Isoparaffins | 39.44 | 37.21 |
| n-Paraffins | 1.20 | 7.00 |
| Cyclic-$C_5$ | 10.92 | 12.78 |
| Cyclic-$C_6$ | 0.04 | 0.00 |
| Olefins | 30.40 | 26.40 |
| Diolefins | 13.70 | 8.30 |

From these data it is observed that the concentration of aromatics increases from 4.02 percent in the feed to 7.70 percent in the product, an increase of approximately 90 percent.

Having described the invention, what is claimed is:

1. A process for the aromatization of olefin hydrocarbons comprising contacting feed streams containing olefinic hydrocarbons having from about 6 to about 12 carbon atoms, and higher, at temperatures ranging from about 300° C. to about 800° C., and pressures ranging from about atmospheric to about 150 psi, with a catalyst comprising a chrysotile and a transition metal component selected from Group VIB and Group VIII metals, of the Periodic Table of the Elements.

2. The process of claim 1 wherein the reaction is conducted at temperatures ranging from about 450° C. to about 550° C.

3. The process of claim 1 wherein the reaction is conducted at pressures ranging from atmospheric to about 75 psi.

4. The process of claim 1 wherein the chrysotile is in the physical form of tubes, and the surface area of the tubes ranges from about 110 m²/g to about 250 m²/g.

5. The process of claim 1 wherein the chrysotile is in the physical form of flakes, and the surface area of the flakes ranges from about 250 m²/g to about 500 m²/g.

6. The process of claim 1 wherein the chrysotile component of the catalyst composite contains from about 2 to about 10 wt. percent aluminum.

7. The process of claim 6 wherein the catalyst composite contains from about 0.1 to about 1 wt. percent platinum 8. The process of claim 6 wherein the catalyst composite contains from about 1 to about 15 wt. percent molybdenum, as molybdenum oxide.

9. The process of claim 6 wherein the catalyst composite contains from about 1 to about 15 wt. percent tungsten, as the oxide.

10. The process of claim 6 wherein the catalyst composite contains from about 1 to about 15 wt. percent chromium, as the oxide.

* * * * *